April 15, 1924.
G. PETERSEN
CLAMP FASTENER
Filed Dec. 15, 1922
1,490,847
2 Sheets-Sheet 1
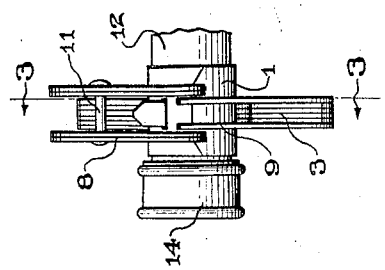
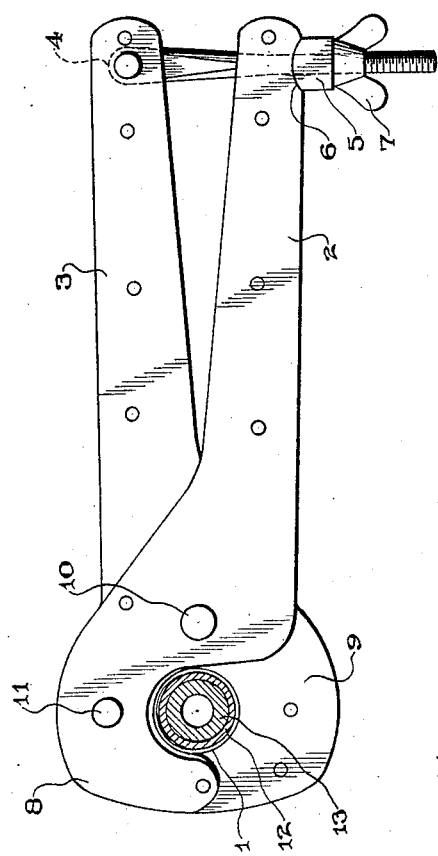
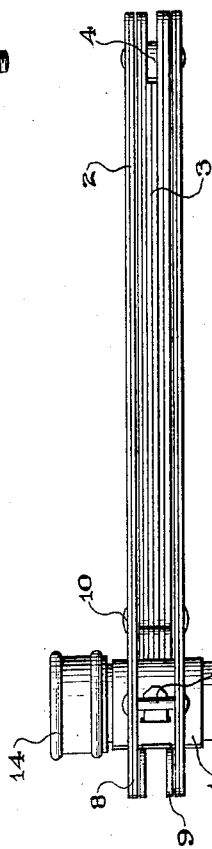
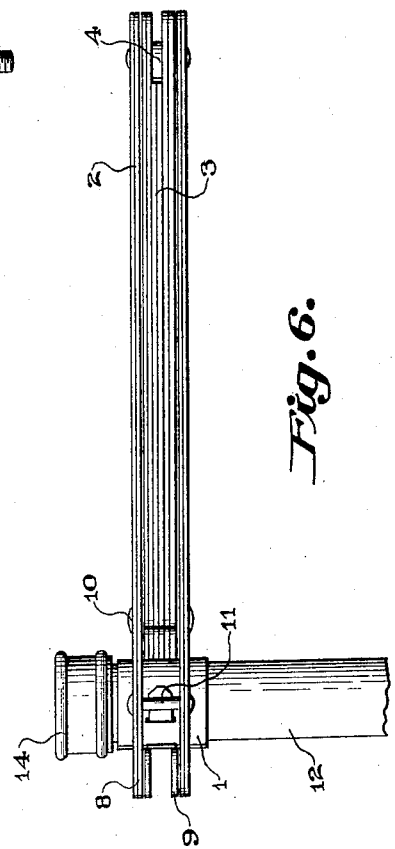
George Petersen
INVENTOR
BY Victor J. Evans
ATTORNEY
H. A. LaClair
WITNESS:

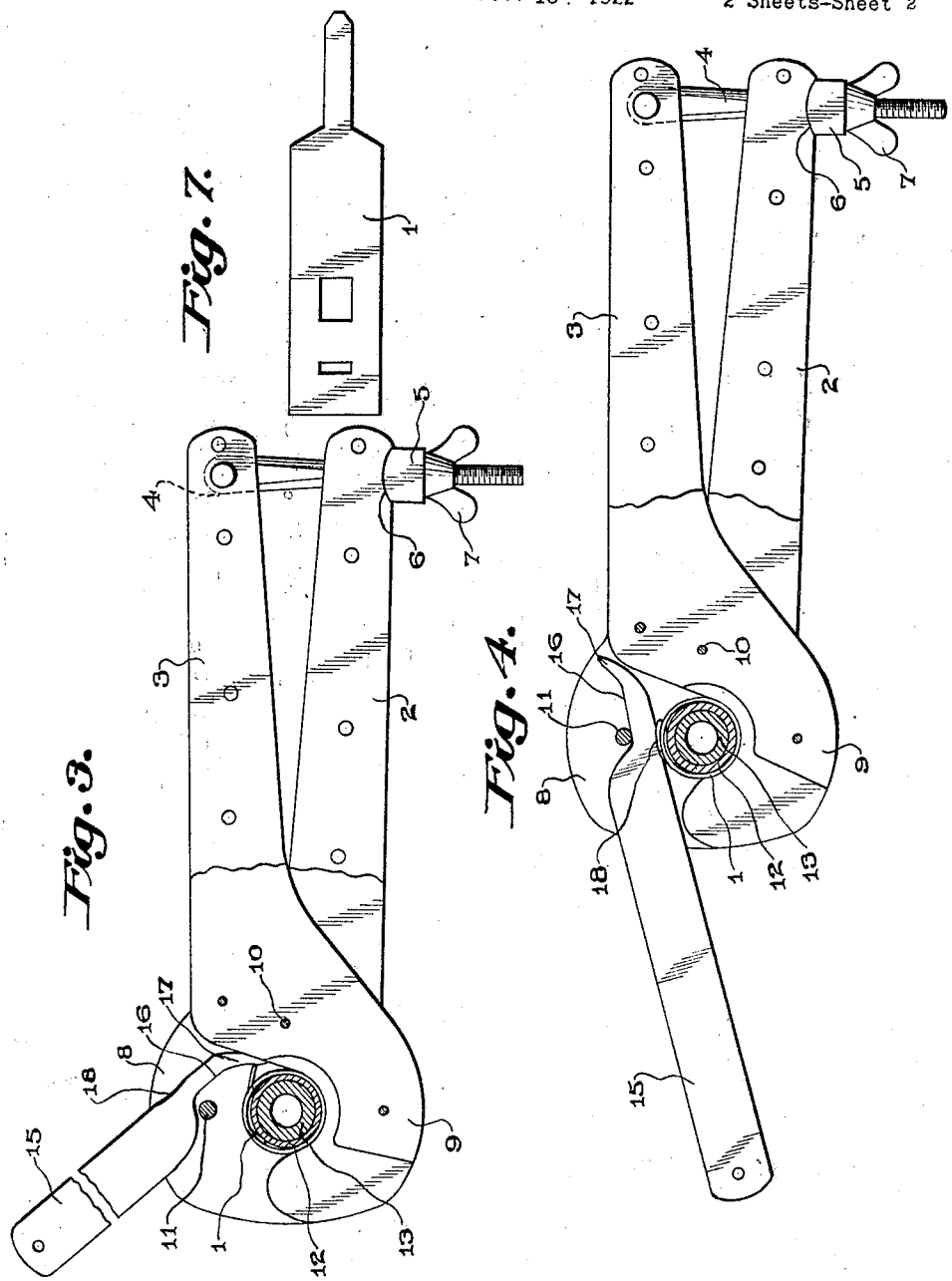

Patented Apr. 15, 1924.

1,490,847

UNITED STATES PATENT OFFICE.

GEORGE PETERSEN, OF MILWAUKEE, WISCONSIN.

CLAMP FASTENER.

Application filed December 15, 1922. Serial No. 607,146.

*To all whom it may concern:*

Be it known that I, GEORGE PETERSEN, a citizen of the United States, residing at Milwaukee, in the county of Milwaukee and State of Wisconsin, have invented new and useful Improvements in Clamp Fasteners, of which the following is a specification.

The object of this invention is to produce a simple, cheap and effective means for forcing the tongue of a split ring hose clamp (such as forms the subject matter of my U. S. Patent No. 1,411,930, granted April 4, 1922) through the slits provided therefor and thereafter bending the tongues against the side of the body of the clamp for adjustably securing the said clamp on a hose.

To the attainment of the foregoing and other objects which will present themselves as the nature of the invention is better understood, reference is to be had to the drawings which accompany and which form part of this application.

In the drawings:—

Figure 1 is a plan view showing the improvement gripping a clamp to force the tongue through the slits in the split ring body of said clamp, Figure 2 is an end view thereof, Figure 3 is a sectional view on the line 3—3 of Figure 2, showing the manner in which the tool is employed for bending the tongue after the same has been forced through the slits, Figure 4 is a similar view showing the manner in which the tool is employed for bending the tongue against the body of the clamp, Figure 5 is a view of the clamp employed, and Figure 6 is a plan view of the device in the position disclosed by Figure 1.

Figure 7 is a plan view of the clamping band.

The hose clamp is of a construction similar to that upon which I have obtained U. S. Patent No. 1,411,930, the same comprising a split ring having one of its ends formed with an extending tongue and its body portion adjacent its opposite end slitted to receive the tongue therethrough. It is in order that the tongue may be easily forced through the slits and thereafter bent over the clamp that I have constructed the clamp fastener that forms the subject matter of this invention. The fastener includes members having handles 2 and 3 respectively each of which has its outer end bifurcated, and the handle 2 is of a greater thickness than the handle 3. The handle 3 has pivoted in its bifurcated end the non-threaded end of a bolt member 4, the said bolt passing through the bifurcated end of the handle 2. The bolt has freely mounted thereon a washer 5 whose inner face is concaved to be received in a dished concavity 6 on the outer edge of the handle 2, and this washer is contacted by a wing nut 7 which is screwed on the bolt.

Preferably, and as disclosed by the drawings, the handle members are made up of metal plates, the outermost plates of the handles being extended beyond the inner plates thereof, and said outer plates are rounded to provide jaws 8 and 9 respectively. The members constituting the jaws 8 of the handle 2 are disposed in lapping relation with the jaws 9 of the handle 3, the said jaws being pivotally connected, as at 10. The plates constituting the jaws 8 have passed therethrough a rod member 11 having its ends headed, and the inner surfaces of each of the jaws are rounded whereby to receive therein the split ring constituting the clamp 1. The split ring is arranged around a hose 12 and is designed to be compressed against the nipple 13 of a pipe coupler 14. By first arranging the tongue of the clamp in a line with the slits in the body thereof and thereafter moving the handles 2 and 3 toward each other through the medium of the wing nut engaging the bolt, the jaw members of the improvement may be brought toward each other so that the tongue will be effectively forced through the slit body of the clamp. The tongue is arranged opposite the rod member 11 in the slotted or bifurcated jaw 8, and after the clamp has been firmly compressed around the hose, I employ a tool for bending the lip against the body of the clamp. This tool is in the nature of a flat bar 15 that is concaved from one of its edges at a point adjacent its end, as at 16, the outer edge of the said bar being rounded to form the end of the concavity with a hook 17. The edge of the bar opposite that provided with the concavity is provided with a depression 18. This depression is designed to rest on the rod 11 to permit of the hook 17 gripping the tongue of the clamp and to allow the bar to be swung to bring the tongue at an outward angle with respect to the bar. Thereafter the concaved portion of the bar will be brought against the inner side of the rod and an outward pressure exerted upon the bar so as to force the lip of the clamp against the body thereof, and further pressure may be exerted upon the said lip to press the same firmly against the body of the clamp.

It is thought that the foregoing description, when taken in connection with the drawings will fully set forth the construction, operation and advantages of the improvement to those skilled in the art to which such inventions relate, so that further detailed description will not be required.

It is, however, to be understood that I do not wish to be restricted to the precise construction herein set forth and illustrated by the drawings, but hold myself entitled to such changes and modifications therefrom as fall within the scope of what I claim.

Having described the invention, I claim:—

1. A means for forcing the tongue of a split ring hose clamp through slots in the body of the tongue and thereafter bending the tongue against the body of the clamp, comprising bifurcated jaws pivotally connected and provided with extending angularly disposed handles, said jaws designed to receive the clamp therebetween, means on the outer ends of the handles for forcing the same toward each other to compress the clamp to force the tongue through the slits thereof, a post providing a fulcrum element in one of the jaws disposed opposite the projected tongue and designed for contacting engagement with a lipped tool which, when swung against the tongue, is adapted to force the tongue against the body of the clamp.

2. In a device for securing a clamp around a hose in which said clamp constitutes a slitted split ring body having a projected tongue to be passed through the slits and thereafter bent over the body of the clamp, comprising slitted jaw members received one in the other, means pivoting the jaws, handles projecting from the jaws having their outer ends bifurcated, a bolt member pivoted in the end of one of the handles and swingable in the end of the other handle, a washer on the bolt, a wing nut on the bolt, a post in one of the jaws disposed opposite the tongue of the clamp, in combination with a tool having a concaved end terminating in a tool, one of its edges inward of the tooth depressed to rest upon the rod to permit of the swinging of the tool to cause the tooth thereof to grip the projected tongue and to move the same against the body of the clamp.

In testimony whereof I affix my signature.

GEORGE PETERSEN.